US011277661B2

(12) United States Patent
Inoue et al.

(10) Patent No.: US 11,277,661 B2
(45) Date of Patent: Mar. 15, 2022

(54) QUALITY INFORMATION COLLECTION SYSTEM, QUALITY INFORMATION COLLECTION METHOD AND PROGRAM

(71) Applicant: Nippon Telegraph and Telephone Corporation, Tokyo (JP)

(72) Inventors: Hiroshi Inoue, Tokyo (JP); Toshiaki Tsuchiya, Tokyo (JP); Takafumi Okuyama, Tokyo (JP); Seisho Yasukawa, Tokyo (JP); Kenichi Endo, Tokyo (JP); Hiroyuki Kitada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/289,818

(22) PCT Filed: Oct. 29, 2019

(86) PCT No.: PCT/JP2019/042347
§ 371 (c)(1),
(2) Date: Apr. 29, 2021

(87) PCT Pub. No.: WO2020/090810
PCT Pub. Date: May 7, 2020

(65) Prior Publication Data
US 2021/0400336 A1    Dec. 23, 2021

(30) Foreign Application Priority Data

Oct. 30, 2018    (JP) .............................. JP2018-204337

(51) Int. Cl.
*H04N 21/442*    (2011.01)
*H04N 21/647*    (2011.01)
(Continued)

(52) U.S. Cl.
CPC ....... *H04N 21/442* (2013.01); *H04N 21/4508* (2013.01); *H04N 21/47217* (2013.01); *H04N 21/64723* (2013.01)

(58) Field of Classification Search
None
See application file for complete search history.

(56) References Cited

U.S. PATENT DOCUMENTS

2016/0088322 A1*  3/2016  Horev .............. H04N 21/23418
                                                             725/14
2018/0376176 A1*  12/2018  Matsumoto ........ H04N 21/2402

FOREIGN PATENT DOCUMENTS

JP    2004-70483    3/2004
JP    2012-70030    4/2012

* cited by examiner

*Primary Examiner* — Omar S Parra
(74) *Attorney, Agent, or Firm* — Fish & Richardson P.C.

(57) ABSTRACT

A quality information collecting system acquiring video data distributed in response to a viewing request and collecting quality-related information regarding video viewing from a viewing client playing back a video includes a quality information control functional unit configured to determine whether or not to request the viewing client having made a viewing request to report quality-related information, based on a network communication situation in which the video data is distributed, and a quality information collecting and analysis functional unit configured to receive, in accordance with a determination of the quality information control functional unit, the quality-related information transmitted from the viewing client.

12 Claims, 12 Drawing Sheets

(51) Int. Cl.
*H04N 21/45* (2011.01)
*H04N 21/472* (2011.01)

| QUALITY-RELATED INFORMATION \ QUALITY-RELATED INFORMATION COLLECTING CONDITIONS | $\rho < x\_1$ | $x\_1 < \rho \leqq x\_2$ | $x\_2 < \rho \leqq x\_3$ | ... | $x\_2 < \rho \leqq x\_{k-1}$ |
|---|---|---|---|---|---|
| y_1 | n_11 | n_21 | n_31 | ... | n_k1 |
| y_2 | n_12 | n_22 | n_32 | ... | n_k2 |
| y_3 | n_13 | n_23 | n_33 | ... | n_k3 |
| ... | ... | ... | ... | ... | ... |
| y_l | n_1l | n_2l | n_3l | ... | n_kl |

| QUALITY-RELATED INFORMATION \ NW STATE | COMMUNICATION PATH LOAD | |
|---|---|---|
| | $\rho \leq 0.5$ | $0.5 < \rho$ |
| RESOLUTION | 3 | 1 |
| FRAME RATE | 3 | 1 |
| CODING RATE | 3 | 1 |
| PLAYBACK STOP TIME | 1 | 1 |
| PLAYBACK STOP PERIOD | 1 | 1 |

(b)

| QUALITY-RELATED INFORMATION \ NW STATE | QUALITY INFORMATION COLLECTING AND ANALYSIS FUNCTIONAL UNIT CPU LOAD | | |
|---|---|---|---|
| | LESS THAN 50% | 50%~70% | MORE THAN 70% |
| RESOLUTION | 1 | 1 | 3 |
| FRAME RATE | 1 | 2 | 3 |
| CODING RATE | 1 | 1 | 3 |
| PLAYBACK STOP TIME | 1 | 1 | 1 |
| PLAYBACK STOP PERIOD | 1 | 1 | 1 |

Fig. 8

| VIEWING CLIENT GROUP / CPU LOAD STATE | | QUALITY INFORMATION COLLECTING AND ANALYSIS FUNCTIONAL UNIT CPU LOAD | | |
|---|---|---|---|---|
| BELONGING REGION | SERVICE TYPE | LESS THAN 40% | 40%~60% | MORE THAN 60% |
| EASTERN JAPAN | PRIORITY | 100 | 200 | 300 |
| WESTERN JAPAN | PRIORITY | 50 | 100 | 150 |
| EASTERN JAPAN | NON-PRIORITY | 500 | 1000 | 1500 |
| WESTERN JAPAN | NON-PRIORITY | 250 | 500 | 750 |

Fig. 9

| DEGREE OF FREEDOM \ α | 0.8 | 0.9 | 0.95 | 0.98 | 0.99 |
|---|---|---|---|---|---|
| 1 | 3.078 | 6.314 | 12.706 | 31.821 | 63.657 |
| 2 | 1.886 | 2.920 | 4.303 | 6.965 | 9.925 |
| 3 | 1.638 | 2.353 | 3.182 | 4.541 | 5.841 |
| 4 | 1.533 | 2.132 | 2.776 | 3.747 | 4.604 |
| 5 | 1.476 | 2.015 | 2.571 | 3.365 | 4.032 |
| 6 | 1.440 | 1.943 | 2.447 | 3.143 | 3.707 |
| 7 | 1.415 | 1.895 | 2.365 | 2.998 | 3.499 |
| 8 | 1.397 | 1.860 | 2.306 | 2.896 | 3.355 |
| 9 | 1.383 | 1.833 | 2.262 | 2.821 | 3.250 |
| 10 | 1.372 | 1.812 | 2.228 | 2.764 | 3.169 |

Fig. 10

QUALITY INFORMATION COLLECTION SYSTEM, QUALITY INFORMATION COLLECTION METHOD AND PROGRAM

CROSS-REFERENCE TO RELATED APPLICATIONS

This application is a National Stage application under 35 U.S.C. § 371 of International Application No. PCT/JP2019/042347, having an International Filing Date of Oct. 29, 2019, which claims priority to Japanese Application Serial No. 2018-204337, filed on Oct. 30, 2018. The disclosure of the prior application is considered part of the disclosure of this application, and is incorporated in its entirety into this application.

TECHNICAL FIELD

The present disclosure relates to a technique for controlling notification of quality-related information from a video playback terminal.

BACKGROUND ART

In recent years, video distribution using the Internet has been actively performed. In a video distribution servicer, it is possible to collect content viewed by users and viewing quality from the viewpoint of marketing and the maintenance and improvement of customer satisfaction. Examples of techniques for collecting viewing information of a user include Patent Literature 1 and Patent Literature 2.

CITATION LIST

Patent Literature

Patent Literature 1: JP 2012-70030 A
Patent Literature 2: JP 2004-070483 A

SUMMARY OF THE INVENTION

Technical Problem

Although it is easy to collect information from all users in a case where the number of users of a video distribution service is small, there is a problem that the load of a network and an information management server increases as the amount of information communication increases in association with an increase in the number of users.

Patent Literature 1 discloses a means for collecting information regarding video viewing of a video playback terminal by a server on a system side, but a means for efficiently collecting information is not mentioned.

The present disclosure is contrived in view of the above-described circumstances, and an object thereof is to provide a technique capable of reducing the amount of quality-related information to be collected in a system that collects quality-related information from a video playback terminal.

Means for Solving the Problem

According to the disclosed technique, there is provided a quality information collecting system that acquires video data distributed in response to a viewing request and collects quality-related information regarding video viewing from a viewing client playing back a video, the quality information collecting system including a quality information control functional unit configured to determine whether or not to request the viewing client having made a viewing request to report quality-related information, based on a network communication situation in which the video data is distributed, and a quality information collecting and analysis functional unit configured to receive, in accordance with a determination of the quality the quality information control functional unit, the quality-related information transmitted from the viewing client.

Effects of the Invention

According to the disclosed technique, a technique capable of reducing the amount of quality-related information to be collected in a system that collects quality-related information from a video playback terminal is provided.

BRIEF DESCRIPTION OF DRAWINGS

FIG. 7 is a diagram illustrating a quality-related information transmission content table.
FIG. 8 is a diagram illustrating a specific example of a quality-related information transmission content table.
FIG. 9 is a diagram illustrating an individual-viewing-client-group quality information collecting frequency table.
FIG. 10 is a diagram illustrating a t-distribution table.

DESCRIPTION OF EMBODIMENTS

Hereinafter, embodiments of the present disclosure will be described in detail with reference to the drawings. The embodiment to be described below is merely an example, and embodiments to which the present invention is applied are not limited to the following embodiment. Hereinafter, a first embodiment and a second embodiment will be described. Regarding the second embodiment, differences from the first embodiment will be mainly described.

First Embodiment

Overall Configuration of System

Figure 1:
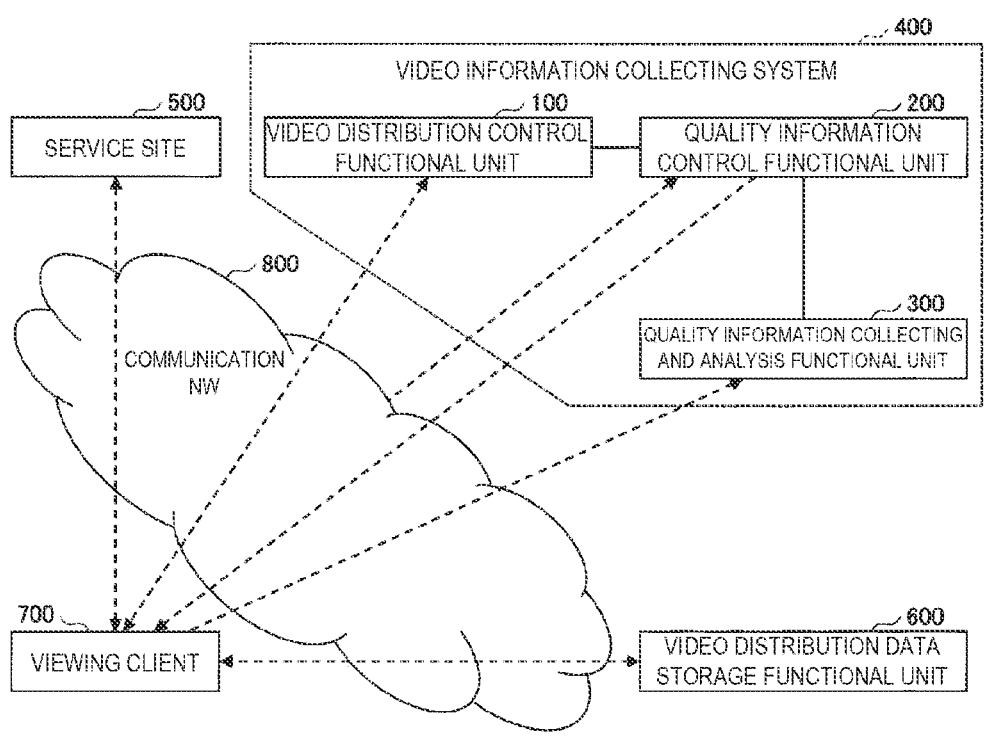
FIG. 1 is a diagram illustrating a configuration of a system according to a first embodiment.

FIG. 1 illustrates the overall configuration of a video distribution system according to the first embodiment of the present disclosure. FIG. 1 also illustrates a flow related to the input and output of information between components.

As illustrated in FIG. 1, the video distribution system according to the present embodiment includes a video information collecting system 400 including a video distribution control functional unit 100, a quality information control functional unit 200, and a quality information collecting and analysis functional unit 300, a service site 500, a video distribution data storage functional unit 600, and a viewing client 700. In addition, communication can be performed through a communication network (NW) 800 between devices as illustrated in the drawing. Note that the video information collecting system 400 may be referred to as a quality information collecting system. In addition, a system including the quality information control functional unit 200 and the quality information collecting and analysis functional unit 300 may be referred to as a quality information collecting system.

Note that, although the number of each of the service site 500, the video distribution data storage functional unit 600, and the viewing client 700 illustrated in FIG. 1 is one, this is for the convenience of illustration, and the actual number of each of the units is two or more.

In addition, the video information collecting system 400 and the quality information collecting system may be constituted by one computer (server) or may be constituted by a plurality of computers. Further, each of the video distribution control functional unit 100, the quality information control functional unit 200, and the quality information collecting and analysis functional unit 300 may be constituted by one computer (server) or may be constituted by a plurality of computers. In addition, all of the video distribution control functional unit 100, the quality information control functional unit 200, the quality information collecting and analysis functional unit 300, the video information collecting system 400, and the quality information collecting system may be realized by a virtual machine on a cloud. The following are outlines of the respective devices and functional units.

The viewing client 700 is a terminal such as a PC, a smartphone, or a tablet which is used by a user of a video distribution service.

The service site 500 is a website (Web server) that provides a service of a video content distribution operator, and has a function of enabling a user to check viewable video content.

The video distribution data storage functional unit 600 has data in which video content is divided. A plurality of video distribution data storage functional units 600 are present on a communication network. The plurality of video distribution data storage functional units 600 may include the same data of video content, or the plurality of video distribution data storage functional units 600 may separately include data in which video content is divided.

The video distribution control functional unit 100 has a function of directly communicating with the video distribution data storage functional unit 600 and ascertains which video distribution data storage functional unit 600 on a network includes data constituting video content.

The quality information control functional unit 200 has a function of directly communicating with the video distribution control functional unit 100 and the quality information collecting and analysis functional unit 300 and a function of acquiring network information, and has a function of determining whether or not to acquire quality-related information from individual viewing clients and giving a notification of determined contents, and the like.

The quality information collecting and analysis functional unit 300 has a function of acquiring quality-related information from the viewing client 700 and calculating and storing viewing quality for video content played back by the viewing client 700, and a function of performing statistical processing of viewing quality for each of a viewing client, video content, and other attribute classifications. In addition, the quality information collecting and analysis functional unit 300 has a function of disclosing them in response to a request given by a network administrator or a content administrator.

Device Configuration Example

Figure 2:
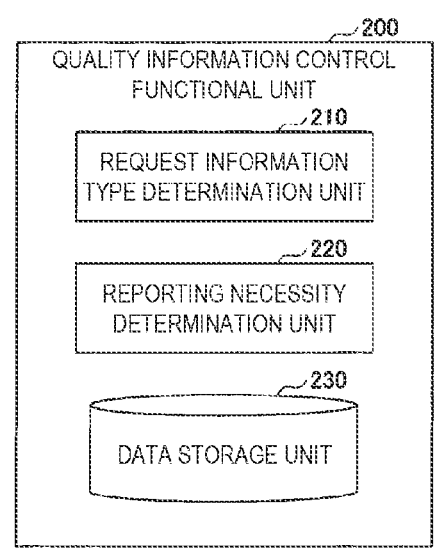
FIG. 2 is a configuration diagram of a quality information control functional unit.

FIG. 2 illustrates an example of a configuration of the quality information control functional unit 200. As illustrated in FIG. 2, the quality information control functional unit 200 includes a request information type determination unit 210, a reporting necessity determination unit 220, and a data storage unit 230 that stores various data. Here, the quality information control functional unit 200 determines the type of quality-related information for requesting reporting from the viewing client 700. In addition, the request information type determination unit 210 determines whether or not to request the viewing client 700 to report quality-related information.

Figure 3:
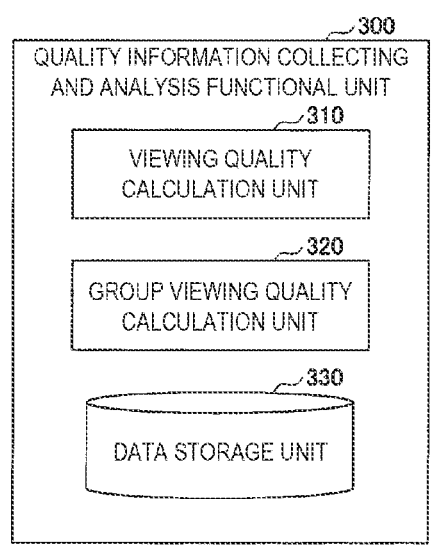
FIG. 3 is a configuration diagram of a quality information collecting and analysis functional unit.

FIG. 3 illustrates an example of a configuration of the quality information collecting and analysis functional unit 300. As illustrated in FIG. 3, the quality information collecting and analysis functional unit 300 includes a viewing quality calculation unit 310, a group viewing quality calculation unit 320, and a data storage unit 330 that stores various data. Here, the viewing quality calculation unit 310 calculates viewing quality for each individual viewing client on the basis of the collected quality-related information. In addition, the group viewing quality calculation unit 320 performs statistical processing using a set of viewing quality in individual viewing clients to calculate viewing quality of a group.

Figure 4:
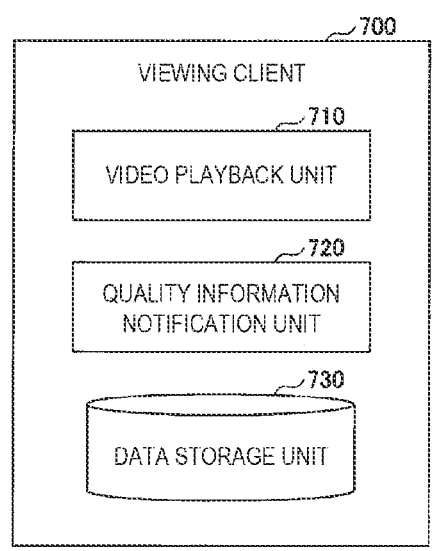
FIG. 4 is a configuration diagram of a viewing client.

FIG. 4 illustrates an example of a configuration of the viewing client 700. As illustrated in FIG. 4, the viewing client 700 includes a video playback unit 710 that acquires video data and plays back a video, a quality information notification unit 720 that gives a notification of quality-related information on the basis of information determined by the quality information control functional unit 200, and a data storage unit 730 that stores various data.

Example of Hardware Configuration

The devices (functional units) constituting the video distribution system in the first embodiment (the same applies to a second embodiment) can be realized, for example, by causing a computer to execute a program describing content of processing described in the embodiment.

That is, the device can be achieved by executing a program corresponding to processing executed by the device using hardware resources such as a CPU and a memory built in the computer. The above program can be recorded in a computer-readable recording medium (a portable memory or the like) and stored or distributed. In addition, the aforementioned program can also be provided through a network such as the Internet, an e-mail, or the like.

Figure 5:
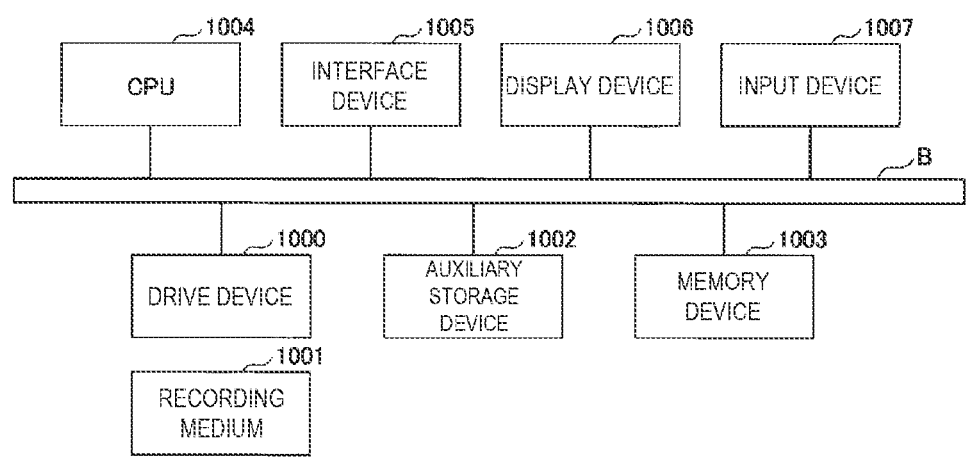
FIG. 5 is a diagram illustrating an example of a hardware configuration of a device.

FIG. 5 is a diagram illustrating an example of a hardware configuration of the computer in the present embodiment. The computer in FIG. 5 includes a drive device 1000, an auxiliary storage device 1002, a memory device 1003, a CPU 1004, an interface device 1005, a display device 1006, an input device 1007, and the like which are connected to each other through a bus B.

A program that realizes processing in the computer is provided on, for example, a recording medium 1001 such as a CD-ROM or a memory card. When the recording medium 1001 storing the program is set in the drive device 1000, the program is installed in the auxiliary storage device 1002 from the recording medium 1001 through the drive device 1000. However, the program does not necessarily have to be installed by the recording medium 1001, and may be downloaded from another computer through a network. The auxiliary storage device 1002 stores the installed program and also stores necessary files, data, and the like.

The memory device 1003 reads the program from the auxiliary storage device 1002 and stores the program in a case where an instruction for starting the program is given. The CPU 1004 realizes a function related to the device in the video distribution system according to the program stored in the memory device 1003. The interface device 1005 is used as an interface for connection to the network. The display device 1006 displays a graphical user interface (GUI) or the like according to the program. The input device 1007 includes a keyboard, a mouse, buttons, a touch panel, and the like, and is used to input various operation instructions.

Example of Operation of System

Figure 6:
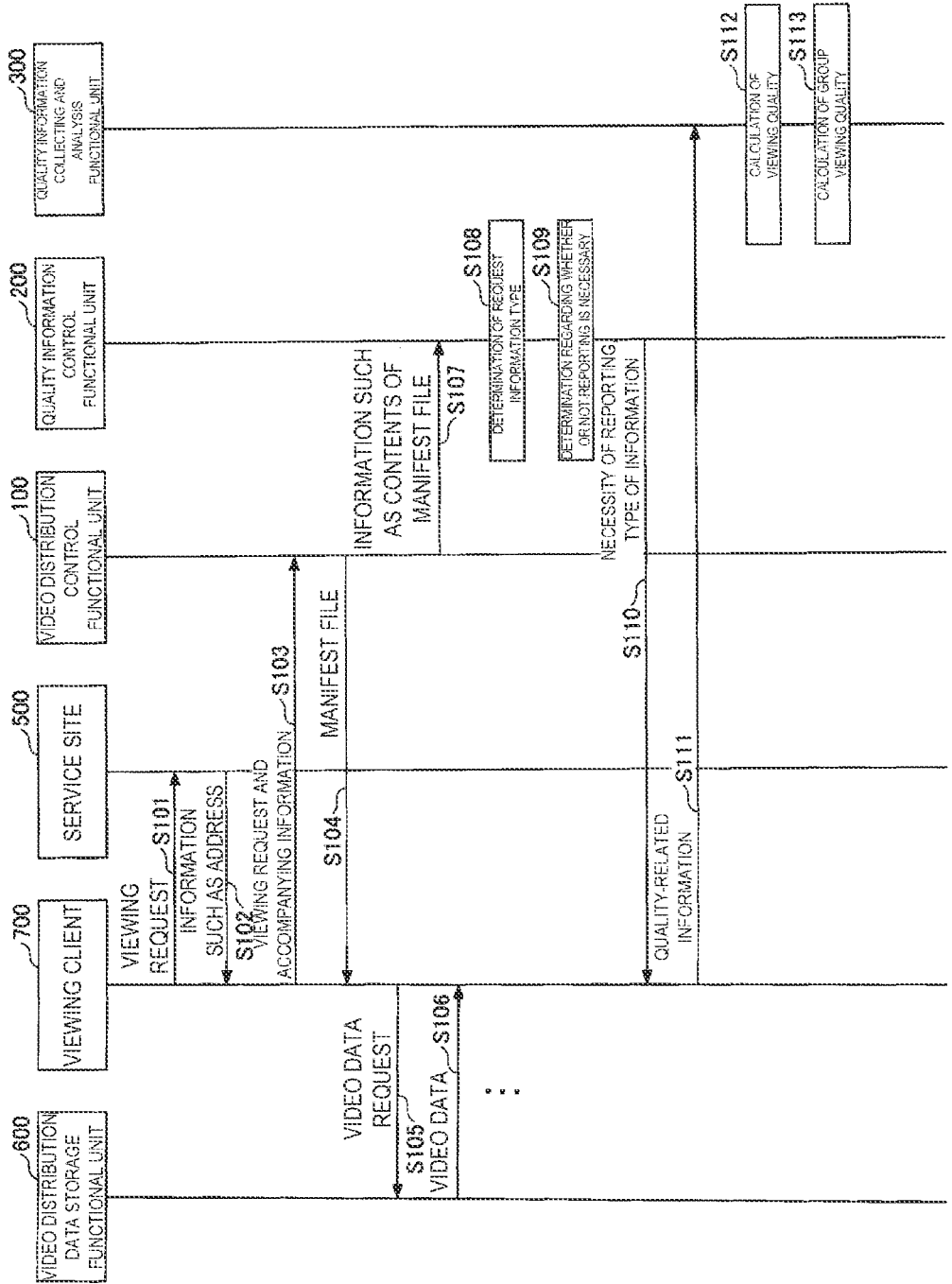
FIG. 6 is a sequence diagram illustrating an operation of the system according to the first embodiment.

Hereinafter, an example of an operation of the video distribution system according to the first embodiment will be described in accordance with a procedure illustrated in the sequence diagram of FIG. 6.

S101 to S107

In S (step) 101, a service user first accesses the service site 500 using the viewing client 700, selects video content that the service user desires to view, and makes a viewing request.

In S102, the service site 500 notifies the viewing client of an address of the video distribution control functional unit 100 to determine from which video distribution data storage functional unit 600 the requested video content is distributed. The service site 500 may also have a function of informing the viewing client 700 of the type of information required to select the video distribution data storage functional unit 600 and prompting the video distribution control functional unit 100 to give a notification of the type of information as accompanying information.

In S103, the viewing client 700 notifies the video distribution control functional unit 100 of a viewing request for video content and accompanying information in a case where there is any accompanying information, in response to the notification given from service site 500.

In S104, the video distribution control functional unit 100 creates data constituting the requested video content as a manifest file along with an address of the video distribution data storage functional unit 600 on the basis of information received from the viewing client 700, and transmits the created manifest file to the viewing client 700. Note that, in addition to a list of video data to be acquired, information regarding the entire content, information regarding encryption, and the like are described in the manifest file.

In S105, the viewing client 700 sequentially requests data constituting the video content from the video distribution data storage functional unit 600 in accordance with content of the received manifest file. In S106, the video distribution data storage functional unit 600 transmits the requested data to the viewing client 700. Thereby, the video playback unit 710 of the viewing client 700 plays back the received data.

In S107, the video distribution control functional unit 100 notifies the quality information control functional unit 200 of the information received from the viewing client 700 and content of the transmitted manifest file. Note that S104 and S107 are executed at the same time.

S108 Determination of Request Information Type

In S108, the request information type determination unit 210 in the quality information control functional unit 200 determines the type of quality-related information desired to be acquired from the viewing client 700 using all or a portion of the following three pieces of information. The first information is information received from the video distribution control functional unit 100 (for example, various attributes such as information indicating a region of the viewing client or a priority). The second information is network information collected from the communication NW 800 (for example, a communication path load as a communication condition). The third information is state information of the quality information collecting and analysis functional unit 300 (for example, a CPU load). Hereinafter, the process of S108 will be described in more detail.

The data storage unit 230 of the quality information control functional unit 200 stores a quality-related information transmission content determination table which is a table of k columns and l rows. FIG. 7 illustrates an example of the table. As illustrated in FIG. 7, the column of the quality-related information transmission content determination table is a collecting condition for quality-related information to be collected, and the row is the type of quality-related information. Furthermore, a frequency designation value n is described for the value of the table. The frequency designation value is the number of viewing requests for one information acquisition. For example, in a case where the frequency designation value is 10, the quality-related information is acquired once for 10 viewing requests received from the viewing client 700.

FIGS. 8(*a*) and 8(*b*) illustrate specific examples of the quality-related information transmission content determination table. In the examples illustrated in FIGS. 8(*a*) and 8(*b*), the types of quality-related information includes five types of a resolution, a frame rate, a coding rate, a playback stop time, and a playback stop period. In addition, the frequency at which respective reports are requested is determined from a video information communication path load in the communication NW 800 and a CPU load of the quality information collecting and analysis functional unit 300. The video information communication path load may be a load of a communication path between a viewing client and the video distribution data storage functional unit 600 for the individual viewing clients, or may be a load of a communication path through which video data of a plurality of viewing clients in the same region passes.

In the present embodiment, the reporting of quality-related information is requested using a product of the frequency designation value obtained on the basis of the video information communication path load in the communication NW 800 and the frequency designation value obtained on the basis of the CPU load of the quality information collecting and analysis functional unit 300 as a final frequency designation value. Specific examples are as follows. Note that the use of such a product is an example.

For example, as illustrated in FIG. 8(*a*), in a case where a communication path load is 40% (corresponding to $p \leq 0.5$) and a CPU load of the quality information collecting and analysis functional unit 300 is 30%, a resolution, a frame rate, and a coding rate are 3×1=3. Thus, for each of the resolution, the frame rate, and the coding rate, the reporting of the information is requested at the frequency of once for three viewing requests given by the viewing client 700. That is, reporting is not requested two out of three times. In addition, 1×1=1 is established for each of the playback stop time and the playback stop period, and thus reporting is requested each time in response to a viewing request given by the viewing client 700 for each of the playback stop time and the playback stop period.

Similarly, in a case where a communication path load is 65% and a CPU load of the quality information collecting and analysis functional unit 300 is 60%, each of the resolution, the coding rate, the playback stop time, and the playback stop period is required to be transmitted each time, but the frame rate is required to be transmitted every two times.

Note that, when the table is created, more information and more complex functions may be used. In the present embodiment, it is determined that the acquisition of quality-related information may be omitted from a tendency to continue a state where viewing quality is satisfactory in a low communication path load state. That is, in the example of FIG. 8(*a*), the resolution and the like have a frequency designation value indicating that reporting is requested once for three viewing requests in a low communication path load state.

Further, in a case where a CPU load of the quality information collecting and analysis functional unit is high, there is a concern that processing may be useless, and thus it is additionally determined that acquisition is omitted from quality-related information which is less necessary.

S109: Determination of Necessity of Reporting

In S109, the reporting necessity determination unit 220 of the quality information control functional unit 200 determines whether or not to request the viewing client 700 to report quality-related information.

Note that the amount of reporting of quality-related information can be reduced by performing only the process of S108 or the processing of S109, and thus S108 may be performed without performing S109, or S109 may be performed without performing S108.

In the present embodiment, both S108 and S109 are performed. Here, in a case where S109 is performed without performing S108, for example, all types of quality-related information may be reported.

Further, in the present embodiment in which both S108 and S109 are performed, for example, in a case where a certain viewing client 700 is set as a target for a reporting request in S109, the viewing client 700 is requested to report the type of quality-related information which is determined in S108. For example, in a case where it is determined in S108 that the viewing client 700 is requested to report a playback stop period each time, the viewing client 700 determined as a target for a reporting request in S109 is requested to report a playback stop period. Further, for example, in a case where it is determined in S108 that the viewing client 700 is requested to report a frame rate every three times, the viewing client 700 determined as a target for a reporting request in S109 is requested to report a frame rate at the frequency of once for three reporting requests. Hereinafter, the content of S109 will be described in detail.

Here, a viewing client serving as a service target of the system is classified into a plurality of viewing client groups on the basis of a plurality of attributes. As a specific example, the viewing client groups are classified according to three attributes, that is, a belonging region (Eastern Japan/Western Japan), a communication path load situation (less than 40%/40% to 60%/60% or more), and a service type (priority/non-priority).

In this case, the viewing client groups are classified into twelve groups of (Eastern Japan, less than 40%, priority): (Eastern Japan, less than 40%, non-priority):(Eastern Japan, 40% or more and less than 60%, priority):(Eastern Japan, 40% or more and less than 60%, non-priority):(Eastern Japan, 60% or more, priority):(Eastern Japan, 60% or more, non-priority):(Western Japan, less than 40%, priority): (Western Japan, less than 40%, non-priority):(Western Japan, 40% or more and less than 60%, priority):(Western Japan, 40% or more and less than 60%, non-priority): (Western Japan, 60% or more, priority):(Western Japan, 60% or more, non-priority). Each of the groups has a frequency designation value. As described above, the frequency designation value is the number of viewing requests for one information acquisition. For example, in a case where the frequency designation value is 100, information is acquired once for 100 viewing requests.

The initial value of the frequency designation value is derived by the reporting necessity determination unit 220 using the following methods (1) to (5). Note that the initial value of the frequency designation value may be derived outside the quality information control functional unit 200, and the result may be stored in the data storage unit 230 of the quality information control functional unit 200.

(1) A ratio of the number of users is applied for the belonging region.

(2) A communication path load ratio is further applied for the belonging region. The communication path load ratio is arbitrarily set by a system administrator. For example, less than 40%:40% to 60%:60% or more is 4:2:1.

(3) Regarding priority/non-priority, a system administrator arbitrarily sets the value of a ratio.

(4) Each of the groups multiplies by a ratio of its own attributes.

(5) Each of the groups calculates a reciprocal of the value of (4), multiplies the reciprocal by an arbitrary constant "a," and rounds up or rounds down decimals to the nearest whole number.

Note that the arbitrary constant "a" is a value for adjusting an information collecting frequency in accordance with a CPU load of the quality information collecting and analysis functional unit 300, and may be any value. However, if possible, it is preferable to measure the processing capacity of the quality information collecting and analysis functional unit 300 in advance and set the value in accordance with measurement results.

Specifically, the initial value of the frequency designation value is calculated as follows. It is assumed that a ratio of the number of users in Eastern Japan to the number of users in Western Japan is set to 5:3, a communication path load ratio of less than 40%, 40% or more and less than 60%, and 60% or more is set to 4:2:1, a priority/non-priority ratio is set to 2:1, and the arbitrary constant "a" is set to 2400.

In the case of the setting described above, (4) is as follows. (Eastern Japan, less than 40%, priority):(Eastern Japan, less than 40%, non-priority):(Eastern Japan, 40% or more and less than 60%, priority):(Eastern Japan, 40% or more and less than 60%, non-priority):(Eastern Japan, 60% or more, priority):(Eastern Japan, 60% or more, non-priority):(Western Japan, less than 40%, priority):(Western Japan, less than 40%, non-priority):(Western Japan, 40% or more and less than 60%, priority):(Western Japan, 40% or more and less than 60%, non-priority):(Western Japan, 60% or more, priority):(Western Japan, 60% or more, non-priority)

=5·4·2:5·4·1:5·2·2:5·2·1:5·1·2:5·1·1:3·4·2:3·4·1:3·2·2:3·2·1:
3·1·2:3·1·1=40:20:20:10:10:5:24:12:12:6:6:3.

When the step of (5) is calculated, (Eastern Japan, less than 40%, priority):(Eastern Japan, less than 40%, non-priority):(Eastern Japan, 40% or more and less than 60%, priority):(Eastern Japan, 40% or more and less than 60%, non-priority):(Eastern Japan, 60% or more, priority):(Eastern Japan, 60% or more, non-priority):(Western Japan, less than 40%, priority):(Western Japan, less than 40%, non-priority):(Western Japan, 40% or more and less than 60%, priority):(Western Japan, 40% or more and less than 60%, non-priority):(Western Japan, 60% or more, priority):(Western Japan, 60% or more, non-priority)=1/40·2400:1/20·2400:1/20·2400:1/10·2400:1/10·2400:1/5·2400:1/24·2400:1/12·2400:1/12·2400:1/6·2400:1/6·2400:1/3·2400=60:120:120:240:240:480:100:200:200:400:400:800.

In this case, in the group of (Eastern Japan, less than 40%, priority), sampling is performed at a ratio of 1 out of 60 viewing requests. That is, the reporting necessity determination unit 220 identifies to which group the viewing request belongs on the basis of information received from the video distribution control functional unit 100, information acquired from the communication NW 800, and the like. In addition, when the identified group is the group of (Eastern Japan, less than 40%, priority), the reporting necessity determination unit 220 determines that a viewing client belonging to the group is requested to report quality-related information at a ratio of 1 out of 60 viewing requests according to the group.

In more detail, the reporting necessity determination unit 220 includes a counter and determines to request a notification of quality-related information for every 60 requests of the group. Alternatively, the reporting necessity determination unit may determine to request a notification of quality-related information with respect to the viewing requests with a probability of 1/60 using random numbers.

A frequency designation value for each group stored in the data storage unit 230 is updated at arbitrary time intervals by the reporting necessity determination unit 220. For example, the frequency designation value is updated at five-minute intervals.

Further, for example, in a case where a CPU load state of the quality information collecting and analysis functional unit 300 is less than 40%, a reciprocal of an arbitrary constant "b" is multiplied by a frequency designation value for each group to update the frequency designation value. In a case where the CPU load state is 40% or more and less than 60%, a frequency designation value is not updated. In a case where the CPU load state is 60% or more, a frequency designation value is multiplied by "b" for each group to update the frequency designation value. The arbitrary constant "b" is a value for adjusting an information collecting frequency in accordance with the processing capacity of the quality information collecting and analysis functional unit and is set to a value of approximately 1.2. With this update, quality-related information is more frequently reported when a CPU load is low, and the frequency of reporting of quality-related information is suppressed when a CPU load is high.

Further, instead of or in addition to calculating a frequency designation value for each group through the above-described calculation, a simple method using an individual-viewing-client-group quality information collecting frequency table illustrated in FIG. 9 may be used. The individual-viewing-client-group quality information collecting frequency table is a table stored in the data storage unit 230.

The table illustrated in FIG. 9 is a table in which values set by a system administrator in advance and indicating how often quality-related information is sampled for each of groups are recorded in the form of a table. As illustrated in FIG. 9, for example, regarding a group of viewing clients who are located in Eastern Japan and are targets for priority service use, sampling is performed at a ratio of 1 out of 100 viewing requests in a case where a CPU load of the quality information collecting and analysis functional unit 300 is less than 40%.

In more detail, the reporting necessity determination unit 220 includes a counter and determines to request a notification of quality-related information for every 100 requests of the group. Alternatively, the reporting necessity determination unit may determine to request a notification of quality-related information with respect to the viewing requests with a probability of 1/100 using random numbers.

S110

In S110, the quality information control functional unit 200 notifies the viewing client 700 of the necessity of reporting quality-related information and the type of information in accordance with the results of S108 and S109. Note that, in the case where it is not necessary to report quality-related information, no notification may be given, or a notification indicating that the reporting is unnecessary may be given.

S111: Acquisition and Notification of Quality-Related Information

In S111, the quality information notification unit 720 in the viewing client 700 acquires quality-related information requested from the quality information control functional unit 200 during the playback of a video. Then, when there is a change in the value of the quality-related information, the quality information notification unit 720 records input types (for example, a resolution, a frame rate, a coding rate, a playback stop time, and a playback stop period) and the changed value in the data storage unit 730. On the other hand, in a case where there is no change in any of the input types, the quality information notification unit 720 records a flag (no-change flag) indicating that there is no change in the data storage unit 730. Then, the quality information notification unit 720 notifies the quality information collecting and analysis functional unit 300 of quality-related information (a changed value or a flag) at a predetermined timing (periodic timing).

Note that, regarding a first notification and the next notification (second notification), all quality-related information to be reported is notified of, rather than a changed value or a flag. This is because the first notification is an initial value and needs to be transmitted, and regarding the second notification, a low-quality video is played back to reduce an initial delay in playback generally in video playback through Internet distribution and is then switched to a high-quality video after a while.

In addition, the quality information notification unit 720 of the viewing client 700 gives a notification of a flag (high-quality flag) indicating high quality instead of the value of quality-related information at the next notification timing in a case where playback does not stop during the viewing of a video, and both a resolution and a coding rate have fixed values or greater, for example, 1280×720 or more and 2 Mbps or more. This is because a servicer's desire to check the state of quality is often a desire to predict a problem, and the necessity of quantifying quality in detail is low in a case where the quality is maintained at a fixed level or more. However, in a case where there is a desire to quantify quality in detail even in the case of high quality, the present procedure (a procedure of transmitting a high quality flag) is omitted.

S112: Calculation of Viewing Quality

The quality information collecting and analysis functional unit 300 collects quality-related information transmitted from the viewing clients and stores the quality-related information in the data storage unit 330. In S112, the viewing quality calculation unit 310 calculates viewing quality of video content played back by the individual viewing clients 700 according to a predetermined calculation formula, and stores the calculated video quality in the data storage unit 330.

When the viewing quality is calculated, regarding the no-change flag received from the viewing client 700, the viewing quality calculation unit 310 traces back to the past until a value is recorded for the same type of input for each input type and replaces the target "no-change flag" with the value traced back from the past. The viewing quality is calculated from the quality-related information using a general calculation formula. For example, regarding the video quality, a calculation formula of quality of experience (QoE) of video quality is used. However, a calculation formula of video quality can be arbitrarily created according to a purpose and is not limited to a specific calculation formula. In addition, for the high quality flag received from the viewing client 700, the viewing quality calculation unit 310 does not perform calculation and records a result indicating high quality. Alternatively, the viewing quality calculation unit 310 calculates viewing quality of a video as a provisional value indicating the minimum guarantee according to the following procedure. The following procedure is performed when a resolution and a coding rate are set to minimum values equal to or greater than fixed values (the resolution: 1280×720, the coding rate: 2 Mbps), the value of a second notification is applied to a frame rate, and a playback stop time and a playback stop period have no value.

S113: Calculation of Group Viewing Quality

The group viewing quality calculation unit 320 of the quality information collecting and analysis functional unit 300 estimates a viewing quality upper limit and a viewing quality lower limit for each viewing client group according to the following procedure. The classification of viewing client groups may be the same as or different from the classification in S109 described above.

First, it is assumed that there are n viewing quality samples calculated on the basis of quality-related information obtained from a target viewing client group, and the respective viewing qualities thereof are q1, . . . and qn. In this case, the group viewing quality calculation unit 320 estimates a lower limit of a viewing quality as $$x - t(n-1, (1-\alpha)/2) \times (\sigma 2/n)^{\wedge} 0.5 \quad \text{(Expression 1)}$$

using x, σ2, and t (n−1, (1−α)/2). In addition, the group viewing quality calculation unit 320 estimates an upper limit of a viewing quality as $$x + t(n-1, (1-\alpha)/2) \times (\sigma 2/n)^{\wedge} 0.5 \quad \text{(Expression 2)}$$

using x, σ2, and t. Here, x is an average of viewing quality samples and is x=(q1+q2+·+qn)/n. In addition, σ2 is an unbiased variance and is σ2=Σ(qi−x)^2/(n−1). In addition, t (n−1, (1−α)/2) represents (1−α)/2×100% points of a t distribution of a degree of freedom n−1. The group viewing quality calculation unit 320 stores the lower limit and the upper limit in the data storage unit 330 as viewing quality values of the entire viewing client group. Note that t (n−1, (1−α)/2) is stored in the data storage unit 340 in the form of a table as a t-distribution table as illustrated in FIG. 10.

The quality information collecting and analysis functional unit 300 may notify the quality information control functional unit 200 of a group viewing quality obtained from quality-related information. The quality information control functional unit 200 may use information of the received group viewing quality to determine whether or not quality-related information is required to be reported to a viewing client, to determine the type of quality-related information to be reported, and the like, as a portion of information regarding a network communication situation.

Second Embodiment

Next, a second embodiment will be described. Differences from the first embodiment will be mainly described below.

Overall System Configuration, Device Configuration

Figure 11:
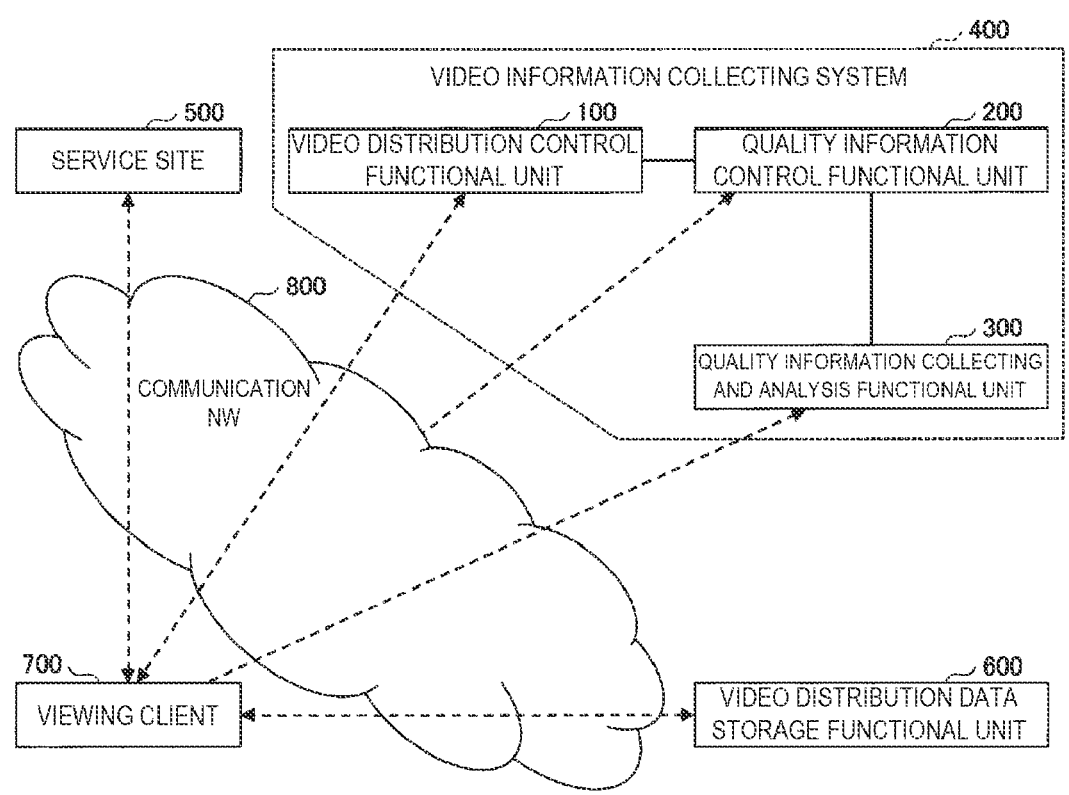
FIG. 11 is a diagram illustrating an example of a system configuration according to a second embodiment.

FIG. 11 illustrates the overall configuration of a video distribution system according to the second embodiment of the present disclosure. FIG. 11 also illustrates a flow related to the input and output of information between units. As illustrated in FIG. 11, components of the video distribution system according to the second embodiment are the same as the components of the video distribution system according to the first embodiment.

However, in the first embodiment, the quality information control functional unit 200 directly instructs the viewing client 700 to determine whether or not reporting is necessary and determine the type of information. On the other hand, in the second embodiment, a quality information control functional unit 200 does not directly instruct a viewing client 700 to determine whether or not reporting is necessary and determine the type of information, and thus a line between a quality information control functional unit 200 and the viewing client 700 is not illustrated in FIG. 11.

The second embodiment is the same as the first embodiment in terms of functional configurations of functional units and devices and in that the devices can be realized by a computer and programs.

Example of Operation of System

Figure 12:
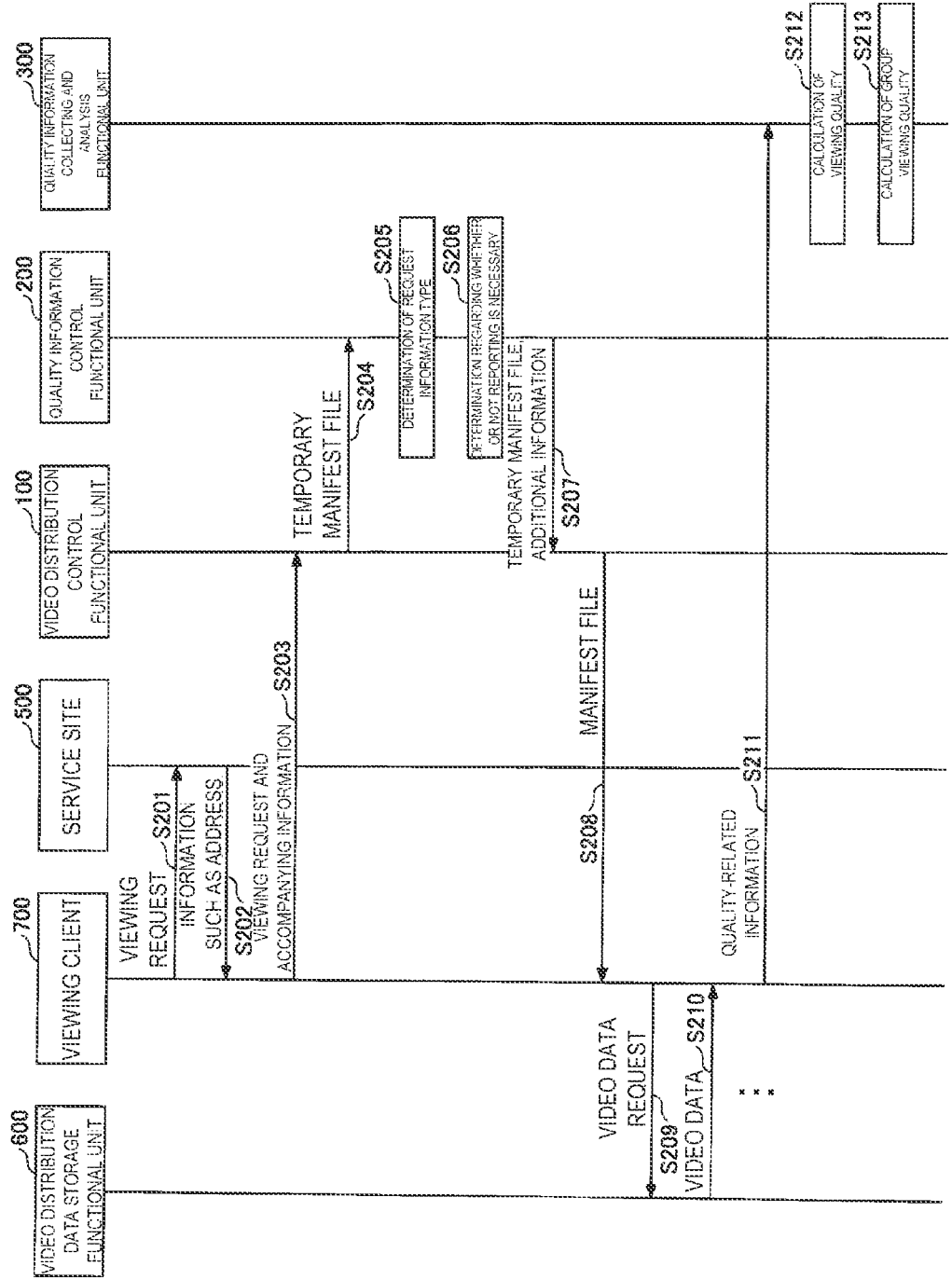
FIG. 12 is a sequence diagram illustrating an operation of the system according to the second embodiment.

Hereinafter, an example of an operation of the video distribution system according to the second embodiment will be described in accordance with a procedure illustrated in the sequence diagram of FIG. 12.

S201 to S204

The operations of S201 to S203 are the same as those of S101 to S103 in the first embodiment.

In S204 a video distribution control functional unit 100 creates data constituting a requested video content as a temporary manifest file along with an address of a video distribution data storage functional unit 600 on the basis of information received from the viewing client 700, and transmits the created manifest file to the quality information control functional unit 200.

S205: Determination of Request Information Type,
S206: Determination of Necessity of Reporting Processing contents in S205 and S206 are the same as those in S108 and S109 in the first embodiment. In addition, also in the second embodiment, similarly to S108 and S109, S205 may be performed without performing S206, and S206 may be performed without performing S205. In the present embodiment, both S205 and S206 are performed similar to S108 and S109 in the first embodiment.

S207 to S211

In S207, the quality information control functional unit 200 transmits the temporary manifest file having information added thereto to the video distribution control functional unit 100 in accordance with results of S205 and S207. The added information is equivalent to information notified to the viewing client 700 in S110 in the first embodiment (the necessity of reporting of quality-related information and the type of quality-related information).

In S208, the video distribution control functional unit 100 transmits the temporary manifest file in which the necessity of reporting of quality-related information and the type of quality-related information are added to the viewing client 700 as a new manifest file.

In S209, the viewing client 700 sequentially requests data constituting a video content from the video distribution data storage functional unit 600 in accordance with contents of the received manifest file. In S210, the video distribution data storage functional unit 600 transmits the requested data to the viewing client 700. Thereby, a video playback unit 710 of the viewing client 700 plays back the received data.

A process of acquiring and giving a notification of quality-related information in S211 is the same as the processing in S111 in the first embodiment.

S212: Calculation of Viewing Quality, S213:
Calculation of Group Viewing Quality A viewing quality calculation process in S212 and a group viewing quality calculation process in S213 are the same as the processes of S112 and S113 in the first embodiment.

Conclusion of Embodiment

As described above, the first embodiment and the second embodiment are based on a video information collecting technique on the Internet, wherein the video information collecting technique is a video distribution technique in which video viewing is achieved by performing the following seven processes. A first process is a process in which a service site 500 on a network receives a viewing request from the viewing client 700 which is used by a viewer. A second process is a process in which the service site 500 notifies the viewing client 700 of an address of the video distribution control functional unit 100 which is a request destination of a video data list. A third process is a process in which the viewing client 700 notifies the video distribution control functional unit 100 of a viewing request. A fourth process is a process in which the video distribution control functional unit 100 notifies the viewing client 700 of a manifest file describing content details of video data and an address of the video distribution data storage functional unit 600 in which the content details are stored. A fifth process is a process in which the viewing client 700 requests the video data from the video distribution data storage functional unit 600 in accordance with contents of the manifest file. A sixth process is a process in which the video distribution data storage functional unit 600 transmits the requested video data to the viewing client 700. A seventh process is a process in which the viewing client 700 displays the video data.

In the first embodiment, the video distribution control functional unit 100 notifies the quality information control functional unit 200 of contents of a manifest file and information regarding the viewing client 700 concurrently with the transmission of the manifest file to the viewing client 700. The quality information control functional unit 200 has a function of acquiring information regarding a network communication situation. In addition, the quality information control functional unit 200 identifies the type of quality-related information constituted by the following information and a notification method (for example, the necessity of a notification) and notifies the viewing client 700 of the type of quality-related information and the notification method together with the contents of the manifest file and the information regarding the viewing client. Here, the following information is a viewing quality or information for calculating a viewing quality to be acquired from the viewing client 700 which is a transmission destination.

The viewing client 700 periodically notifies the quality information collecting and analysis functional unit 300 of quality-related information according to the notified contents, and the quality information collecting and analysis functional unit 300 converts quality-related information into a viewing quality and notifies, for example, the quality information control functional unit 200 of the viewing quality as a portion of the information regarding a network communication situation.

In the second embodiment, the video distribution control functional unit 100 notifies the quality information control functional unit 200 of contents of a manifest file and information regarding a viewing client before transmitting the manifest file to the viewing client 700. The quality information control functional unit 200 has a function of acquiring information regarding a network communication situation. In addition, the quality information control functional unit 200 identifies the type of quality-related information constituted by the following information and a notification method and adds the identified type of quality-related information and notification method to the manifest file, together with the contents of the manifest file and the information regarding the viewing client. Here, the following information is a viewing quality or information for calculating a viewing quality to be acquired from the viewing client 700 which is a transmission destination.

The video distribution control functional unit 100 receives the updated manifest file and transmits the received manifest file to the viewing client 700. Then, the viewing client 700 periodically notifies the quality information collecting and analysis functional unit 300 of quality-related information in accordance with the contents described in the manifest file. Then, the quality information collecting and analysis functional unit 300 converts the quality-related information into a viewing quality and notifies the quality information control functional unit 200 of the viewing quality as a portion of the information regarding a network communication situation.

In the first embodiment and the second embodiment, for example, the following processes are executed.

The quality information control functional unit 200 includes a table for determining whether or not information has been collected for each piece of quality-related information from the quality-related information, a communication path load, and the processing capacity of the quality information collecting and analysis functional unit 300. Then, the quality information control functional unit 200 determines quality-related information to be acquired from the viewing client 700 using a portion or all of the information regarding the network communication situation, the contents of the manifest file, and the information regarding the viewing client 700. In more detail, the quality information control functional unit 200 includes, for example, a table for determining the frequency at which quality-related information is collected from conditions of a communication path load and a table for determining the frequency at which quality-related information is collected from conditions of the processing capacity of the quality information collecting and analysis functional unit 300. Then, the quality information control functional unit 200 calculates a final frequency at which quality-related information is collected from a product of the conditions of the communication path load and the conditions of the processing capacity of the quality information collecting and analysis functional unit 300.

In addition, the quality information control functional unit 200 has classification information for classifying viewing predetermined clients. Then, the quality information control functional unit 200 selects only some of the viewing clients for a specific group, causes the selected viewing client to give a notification of quality-related information, and determines that the other viewing clients are not required to give a notification of quality-related information. The necessity of giving a notification of information is transmitted to each of the viewing clients 700 directly or using a manifest file, and the viewing client 700 can execute control of giving or not giving a notification of quality-related information in response to the notification given from the quality information control functional unit 200.

The quality information collecting and analysis functional unit 300 can integrate pieces of quality-related information notified from a portion of a viewing client group to calculate a viewing quality of the viewing client group, and can notify the quality information control functional unit 200 of the calculated viewing quality as a portion of information regarding a network communication situation.

In more detail, the quality information collecting and analysis functional unit 300 calculates an initial value of a frequency designation value using the means of (1) to (5) described above in the following case. The following case means a case where viewing client groups are classified according to a belonging region (Eastern Japan/Western Japan), a communication path load state (less than 40%/40% to 60%/60% or more), and a service type (priority/non-priority). In addition, the frequency designation value is updated at arbitrary time intervals. Then, the quality information collecting and analysis functional unit 300 provides two threshold values for a CPU load state, and multiplies a frequency designation value by a reciprocal of an arbitrary constant "b" for each group to update the frequency designation value in a case where the CPU load state is less than a smaller threshold value. In addition, in a case where the CPU load state is equal to or greater than the smaller threshold value and less than a larger threshold value, the quality information collecting and analysis functional unit 300 does not update the frequency designation value. Further, in a case where the CPU load state is equal to or greater than the larger threshold value, the quality information collecting and analysis functional unit 300 multiplies the frequency designation value by "b" for each group to update the frequency designation value.

Further, in order to determine that only some of the viewing clients are selected for a specific group so as to give a notification of quality-related information, and the other viewing clients are not required to give a notification of quality-related information, a table having the following values set therein may be used for the specific group. The following values are values that are set in advance by a system administrator and indicate how often quality information is sampled.

The viewing client 700 acquires quality-related information requested from the quality information control functional unit 200 during the playback of a video. Then, when there is a change in the value of the quality-related information, the viewing client 700 records input types (a resolution, a frame rate, a coding rate, a playback stop time, and a playback stop period) and the changed value. On the other hand, in a case where there is no change in all of the input types, the viewing client 700 records a flag (no-change flag) indicating that there is no change and notifies the quality information collecting and analysis functional unit 300 of the quality-related information at a predetermined timing.

In addition, the viewing client 700 may acquire quality-related information requested from the quality information control functional unit 200 during the playback of a video and may give a notification of a flag (high quality flag) indicating high quality at the next notification timing in the following case. Here, the following case is a case where playback does not stop during the viewing of a video, and both a resolution and a coding rate have fixed values or greater, for example, 1280×720 or more and 2 Mbps or more.

The quality information collecting and analysis functional unit 300 traces back to the past until a value is recorded for the same type of input for each input type regarding the no-change flag received from the viewing client 700 when a viewing quality is calculated, and replaces the "no-change flag" with a value retroactive to the past.

In addition, when a viewing quality is calculated, the quality information collecting and analysis functional unit 300 may not perform calculation and may record a result indicating high quality for the high quality flag received from the viewing client 700. Alternatively, the quality information collecting and analysis functional unit 300 may calculate a video quality as a provisional value indicating the minimum guarantee according to the following procedure. Here, the following procedure is a procedure performed when a resolution and a coding rate are set to minimum values equal to or greater than fixed values (the resolution: 1280×720, the coding rate: 2 Mbps), the value of a second notification is applied to a frame rate, and a playback stop time and a playback stop period have no value.

It is assumed that the quality information collecting and analysis functional unit 300 has a confidence coefficient $\alpha$ and has n viewing quality samples calculated from information reported from a specific viewing client group. In this case, with respect to an average value x and an invariant variance $\sigma^2$ of the samples, a lower limit and an upper limit of the quality of the specific viewing client group can be set to be the quality of the specific viewing client group. Here, the lower limit and the upper limit of the quality are calculated according to the above-described (Expression 1)

and (Expression 2) using t (n−1, (1−α)/2) representing (1−α)/2×100% points of a t distribution of a degree of freedom n−1.

Features, Effects, and the Like of Techniques According to Embodiments

In the techniques according to the embodiments, for quality information of a video viewed by a user, means for reducing the amount of information to be collected, means for effectively estimating a viewing quality from a small number of pieces of information, and means for controlling whether or not information is collected and the type of information in units of viewing clients in order to realize these means are included. Note that all of these means are not necessarily included. For example, it is possible to solve a problem that the amount of information to be collected increases, using only the means for reducing the amount of information to be collected.

As the means for reducing information to be collected, the amount of information collected from individual viewing clients is reduced by not collecting information or determining a limit of information to be collected in a state where a problem is not likely to occur in a viewing quality from a network congestion state or the general state of a viewing service. Alternatively, sampling is performed in units of groups of viewing users considered to be in similar viewing environments, and a viewing quality is estimated for each viewing user group from sampling data. Here, the state where a problem is not likely to occur in a viewing quality is a state where a viewing quality can be easily estimated as a satisfactory viewing quality.

As the means for effectively estimating a viewing quality from a small number of pieces of information, as described above, sampling is performed in units of groups of viewing users considered to be in similar viewing environments, and a viewing quality is estimated for each viewing user group from sampling data. In addition, a deviation from a population is suppressed by increasing the size of a group to a certain degree or more.

The video distribution control functional unit 100 and the quality information control functional unit 200 that can be intensively managed are provided as the means for suppressing whether or not information is collected and the type of information in units of viewing clients, and control for each viewing opportunity can be performed by interposing determination regarding whether or not information is collected and the type of information in the procedure of a viewing request received from the viewing client 700.

With such techniques, regarding quality-related information of a video viewed by a user, it is possible to reduce the amount of information to be collected and effectively estimate a video quality from a small number of pieces of information, and it is possible to control whether or not information is collected and the type of information in units of viewing clients in order to realize the reduction in the amount of information and the estimation of a video quality.

Note that examples of the application of a video quality include the monitoring of a video quality performed by a servicer, a bypass control technique for monitoring a communication quality by a NW operator to individually control communication paths based on the level of quality required in units of service sessions to maintain a viewing quality, and the like.

At least the following mailers are disclosed in the present specification.

Section 1

A quality information collecting system that acquires video data distributed in response to a viewing request and collects quality-related information regarding video viewing from a viewing client playing back a video, the quality information collecting system including:
a quality information control functional unit; and
a quality information collecting and analysis functional unit.
Here, the quality information control functional unit determines whether or not to request the viewing client having made a viewing request to report quality-related information, based on a network communication situation in which the video data is distributed.
The quality information collecting and analysis functional unit receives, in accordance with a determination of the quality information control functional unit, the quality-related information transmitted from the viewing client.

Section 2

The quality information collecting system according to section 1, wherein the quality information control functional unit includes a request information type determination unit that determines a type of quality-related information required to be reported, based on the network communication situation and a CPU load of the quality information collecting and analysis functional unit.

Section 3

The quality information collecting system according to section 1 or 2, wherein viewing clients are classified into a plurality of groups based on a plurality of attributes, and the quality information control functional unit includes a reporting necessity determination unit that determines whether or not to request the viewing client to report quality-related information, based on a frequency designation value determined for a group to which the viewing client belongs.

Section 4

The quality information collecting system according to any one of sections 1 to 3, wherein viewing clients are classified into a plurality of groups based on a plurality of attributes, and the quality information collecting and analysis functional unit includes a viewing quality calculation unit and a group viewing quality calculation unit.
Here, the viewing quality calculation unit receives quality-related information from a viewing client belonging to a specific group and calculates a plurality of viewing quality samples in the specific group based on the quality-related information.
In addition, the group viewing quality calculation unit calculates a viewing quality of the specific group by performing statistical processing on the plurality of viewing quality samples.

Section 5

The quality information collecting system according to section 4, wherein the quality information collecting and analysis functional unit notifies the quality information control functional unit of the viewing quality of the specific group as a portion of information of the network communication situation.

Section 6

A quality information collecting method at a quality information collecting system that acquires video data distributed in response to a viewing request and collects quality-related information regarding video viewing from a viewing client playing back a video, the quality information collecting method including a determination step and a reception step. Here, the determining step is a step of determining whether or not to request the viewing client having made a viewing request to report quality-related information, based on a network communication situation in which the video data is distributed.

Further, the reception step is a step of receiving, in accordance with a determination of the determining step, the quality-related information transmitted from the viewing client.

Section 7

A program for causing a computer to function as the quality information control functional unit in the quality information collecting system according to any one of sections 1 to 5.

Section 8

A program for causing a computer to function as the quality information collecting and analysis functional unit in the quality information collecting system according to any one of sections 1 to 5.

Although the present embodiment has been described above, the present invention is not limited to such a specific embodiment, and various modifications and changes can be made without departing from the gist of the present invention described in the claims.

REFERENCE SIGNS LIST

100 Video distribution control functional unit
200 Quality information control functional unit
300 Quality information collecting and analysis function
400 Video information collecting system
500 Service site
600 Video distribution data storage functional unit
700 Viewing client
800 Communication NW 800
210 Request information type determination unit
220 Reporting necessity determination unit
230 Data storage unit
310 Viewing quality calculation unit
320 Group viewing quality calculation unit
330 Data storage unit
710 Video playback unit
720 Quality information notification unit
730 Data storage unit
1000 Drive device
1001 Recording medium
1002 Auxiliary storage device
1003 Memory device
1004 CPU
1005 Interface device
1006 Display device
1007 Input device

The invention claimed is:

1. A quality information collecting system that acquires video data distributed in response to a viewing request and collects quality-related information regarding video viewing from a viewing client playing back a video, the quality information collecting system comprising:
a quality information control functional unit, including one or more processors, configured to determine whether or not to request the viewing client having made a viewing request to report quality-related information, based on a network communication situation in which the video data is distributed and a frequency designation value determined for a group to which the viewing client belongs, wherein the viewing client is included in a set of viewing clients that are classified into a plurality of groups based on a plurality of attributes; and
a quality information collecting and analysis functional unit, including one or more processors, configured to receive, in accordance with a determination of the quality information control functional unit, the quality-related information transmitted from the viewing client.

2. The quality information collecting system according to claim 1, wherein the quality information control functional unit includes a request information type determination unit, including one or more processors, configured to determine a type of quality-related information required to be reported based on the network communication situation and a CPU load of the quality information collecting and analysis functional unit.

3. The quality information collecting system according to claim 1, wherein
the quality information collecting and analysis functional unit includes
a viewing quality calculation unit, including one or more processors, configured to receive quality-related information from a viewing client belonging to a specific group and calculate a plurality of viewing quality samples in the specific group based on the quality-related information, and
a group viewing quality calculation unit, including one or more processors, configured to calculate viewing quality of the specific group by performing statistical processing on the plurality of viewing quality samples.

4. The quality information collecting system according to claim 3, wherein the quality information collecting and analysis functional unit is configured to notify the quality information control functional unit of the viewing quality of the specific group as a portion of information of the network communication situation.

5. A quality information collecting method at a quality information collecting system that acquires video data distributed in response to a viewing request and collects quality-related information regarding video viewing from a viewing client playing back a video, the quality information collecting method comprising:
determining whether or not to request the viewing client having made a viewing request to report quality-related information based on a network communication situation in which the video data is distributed and a frequency designation value determined for a group to which the viewing client belongs, wherein the viewing client is included in a set of viewing clients that are classified into a plurality of groups based on a plurality of attributes; and receiving, in accordance with a determination in the determining, the quality-related information transmitted from the viewing client.

6. The quality information collecting method according to claim 5, further comprising:
determining a type of quality-related information required to be reported based on the network communication situation and a CPU load of a quality information collecting and analysis functional unit that receives the quality-related information.

7. The quality information collecting method according to claim 5, wherein
the method further comprises:
receiving quality-related information from a viewing client belonging to a specific group and calculating a plurality of viewing quality samples in the specific group based on the quality-related information; and
calculating viewing quality of the specific group by performing statistical processing on the plurality of viewing quality samples.

8. The quality information collecting method according to claim 7, further comprising:
notifying the viewing quality of the specific group as a portion of information of the network communication situation.

9. A non-transitory computer readable medium storing one or more instructions causing a computer to execute as a quality information collecting system that acquires video data distributed in response to a viewing request and collects quality-related information regarding video viewing from a viewing client playing back a video, the one or more instructions causing the computer to execute:
determining whether or not to request the viewing client having made a viewing request to report quality-related information based on a network communication situation in which the video data is distributed and a frequency designation value determined for a group to which the viewing client belongs, wherein the viewing client is included in a set of viewing clients that are classified into a plurality of groups based on a plurality of attributes; and
receiving, in accordance with a determination in the determining, the quality-related information transmitted from the viewing client.

10. The non-transitory computer readable medium according to claim 9, wherein the one or more instructions further cause the computer to execute:
determining a type of quality-related information required to be reported based on the network communication situation and a CPU load of a quality information collecting and analysis functional unit that receives the quality-related information.

11. The non-transitory computer readable medium according to claim 9, wherein
the one or more instructions further cause the computer to execute:
receiving quality-related information from a viewing client belonging to a specific group and calculating a plurality of viewing quality samples in the specific group based on the quality-related information; and
calculating viewing quality of the specific group by performing statistical processing on the plurality of viewing quality samples.

12. The non-transitory computer readable medium according to claim 11, wherein the one or more instructions further cause the computer to execute:
notifying the viewing quality of the specific group as a portion of information of the network communication situation.

* * * * *